(12) United States Patent
Chelen

(10) Patent No.: US 6,651,591 B1
(45) Date of Patent: Nov. 25, 2003

(54) AUTOMATIC LASER PET TOY AND EXERCISER

(76) Inventor: William E. Chelen, 202 Parkview Dr., Pittsburgh, PA (US) 15236-4575

( * ) Notice: Subject to any disclaimer, the term of this patent is extended or adjusted under 35 U.S.C. 154(b) by 0 days.

(21) Appl. No.: 10/314,358

(22) Filed: Dec. 9, 2002

(51) Int. Cl.[7] .............................................. A01K 29/00
(52) U.S. Cl. ................................................. 119/707
(58) Field of Search ............................... 119/702, 707; 446/485

(56) References Cited

U.S. PATENT DOCUMENTS

| | | | |
|---|---|---|---|
| 3,370,362 A | * | 2/1968 | Dodson ....................... 434/303 |
| 5,443,036 A | | 8/1995 | Amiss et al. |
| 5,651,332 A | | 7/1997 | Moore et al. |
| 5,743,215 A | | 4/1998 | Zeff |
| 5,755,184 A | | 5/1998 | Neidenberger |
| 5,844,377 A | | 12/1998 | Anderson et al. |
| 5,934,223 A | * | 8/1999 | Ellery-Guy .................. 119/702 |
| 2001/0037773 A1 | | 11/2001 | Nathanson et al. |
| 2002/0002955 A1 | | 1/2002 | Lorenz |

* cited by examiner

*Primary Examiner*—Robert P. Swiatek
(74) *Attorney, Agent, or Firm*—Larson & Taylor, PLC

(57) ABSTRACT

A pet toy and exerciser which produces an automatically movable, outwardly projected laser beam. The function thereof is to provide virtual "prey" for the stimulation and exercise of an animal. The device, which does not include a conventional motor, is small (e.g., can be handheld), lightweight, battery operated and silent, and has an extremely long potential cycle life. Electrically energized nitinol wires deflect a visible laser module to produce a virtual laser light target moved through three dimensions.

14 Claims, 5 Drawing Sheets

AUTOMATIC LASER PET TOY AND EXERCISER

FIELD OF THE INVENTION

The present invention relates to a pet toy and exerciser that automatically, without the use of conventional motors, projects a laser beam target in a random three-dimensional field.

RELATED ART

Numerous pet amusement devices have been patented over the decades. Most of those have been based on passive devices that require the initiation of movement by an animal; components of the devices would then move, oscillate, or otherwise return some form of stimulation to the animal. A recent example is U.S. Pat. No. 5,743,215 to Zeff, which includes a passive flexible target attached to a flexible rod; movement initiated by an animal initiates a prolonged oscillatory motion to provide a degree of continuing stimulation to an animal. Similarly, U.S. Pat. No. 5,755,184 to Niedenberger discloses an otherwise passive target or targets attached to a wire and handle that requires human manipulation to induce motion and stimulate an animal's interest.

Recently, devices which use motors and solenoids to create mobile targets have been developed. U.S. Pat. No. 5.651,332 to Moore et al discloses a motorized suspended toy that periodically and automatically oscillates to stimulate an animal's predatory responses.

Alternative methods of animal stimulation using projected light sources as targets have also been developed. U.S. Pat. No. 5,844,377 to Anderson et al is concerned with automatically projecting a moving light image of a prey through the use of a rotating lamp source of light. U.S. Pat. No. 5,443,036 to Amiss et al employs a hand-held laser beam generator; however, this patent requires manipulation and manual movement of the device to create a moving target.

Two recently filed U.S. patent applications for motor driven laser pet toys are also of interest. U.S. application Ser. No. 20010037773 to Nathanson et al discloses a device which uses a drive motor, pulley, and many accessory components to rotate a laser projecting a beam to a reflecting dome and to thereby provide a moving beam outside of the device enclosure. U.S. application Ser. No. 20020002955 to Lorenz similarly uses motors to effectively move a laser beam. In this application, motors, through a series of actuator arms, oscillate mirrors to reflect a laser beam to provide an automatically moving laser light projected outside of the enclosure of the device.

SUMMARY OF THE INVENTION

The present invention exploits the recognized characteristic of an animal, such as a cat or a dog, to be attracted to, and to chase after, the intense focused coherent light of a laser beam. The invention concerns an automatic multidimensional moving virtual laser target that induces animals to follow and chase a virtual prey, thereby obviating the need-for human intervention, activity or manual stimulation.

It is an object of the invention to provide an automatic device, which does not employ conventional motors, for moving a laser beam target through three dimensions so as to provide animal stimulation and exercise without the need for human expenditure of effort or energy.

It is also an object of the invention to automatically, at user-selected intervals, power up the device periodically for short intervals and to thus stimulate and exercise the pet without owner involvement or presence.

Generally speaking, the present invention comprises a miniaturized, silent, projected moving laser target generator which does not use conventional motors.

In accordance with a first aspect of the invention, there is provided a pet toy and exerciser device comprising: a housing; a laser module for producing a laser beam; mounting means for mounting said laser module within said housing so as to enable movement of the laser module in three dimensions; at least one nitinol wire connected to the mounting means for the laser module, said nitinol wire having a contraction state and a relaxation state and producing movement of said laser module in the contraction state of said nitinol wire; position restoring means connected to the mounting means for the laser module for returning said laser module to an initial rest position in the relaxation state of said nitinol wire; and a user activated electrical control circuit connected to said nitinol wire for controlling the states thereof.

Preferably, one control circuit includes a user adjustable electronic timer for automatically switching the states of the at least one nitinol wire on a periodic basis. The electronic timer preferably includes means for providing automatic cyclic operation of the device between first and second modes wherein, during the first mode, the device operates automatically for a set period of time and, during the second mode, the device is turned off for a set period of time.

In accordance with one embodiment of the invention, the mounting means includes a universal joint for enabling movement of the laser module in three dimensions and the at least one nitinol wire comprises first and second nitinol wires connected to said universal joint so as to provide simultaneous vertical and horizontal sweeping of the laser beam produced by said laser module. In one advantageous implementation, the first nitinol wire controls up and down movement of said module and said second nitinol wire controls rotation of said module.

According to a further embodiment, the mounting means comprises a rotatable sleeve and a rotatable support spindle on which said sleeve is mounted, said module being mounted on said sleeve, and said at least one nitinol wire comprising a first wire connected to said sleeve to control rotation thereof, and a second wire connected to said spindle to control rotation thereof.

In accordance with yet another embodiment, the mounting means comprises a rotatable sleeve connected to said laser module, and the device further comprises a mirror for reflecting the laser beam produced by the laser module, and a further rotatable sleeve connected to said mirror; said at least one nitinol wire comprising a first nitinol wire connected to said first rotatable sleeve so as to control rotation thereof and thus control rotation of said laser beam, and a second nitinol wire connected to said further rotatable sleeve so as to control rotation thereof and thus control rotation of said mirror.

According to a second aspect of the invention, there is provided a pet toy and exerciser device comprising: a housing; a laser module, mounted within the housing, for producing a laser beam; a plurality of nitinol wires coupled to the laser module so as to produce movement thereof, said nitinol wires having a contraction state and a relaxation state and producing said movement of said laser module in the contraction state of said nitinol wires; a plurality of return springs connected to the laser module for returning said laser module to an initial rest position in the relaxation state of said nitinol wires; and a user activated electrical control circuit connected to said nitinol wires for, when activated, controlling the states thereof to produce movement of said laser beam.

The control circuit preferably includes a user adjustable electronic timer for automatically and periodically changing the states of the nitinol wires. The timer preferably includes means for providing automatic cyclic operation of the device between first and second modes wherein, during the first mode, the device operates automatically for a set period of time and, during the second mode, the device is turned off for a set period of time.

In one embodiment, the module includes a universal joint for enabling movement thereof in three dimensions and said plurality of nitinol wires comprise first and second nitinol wires connected to said universal joint so as to provide simultaneous vertical and horizontal sweeping of the laser beam produced by said laser module. Advantageously, the first nitinol wire controls up and down movement of said module and said second nitinol wire controls rotation of said module.

In another embodiment, the device further comprises a rotatable sleeve and a rotatable support spindle on which said sleeve is mounted, said module being mounted on said sleeve, and said plurality of nitinol wires comprising a first wire connected to said sleeve to control rotation thereof, and a second wire connected to said spindle to control rotation thereof.

In still another embodiment, the device further comprises a rotatable sleeve connected to said laser module, a mirror for reflecting the laser beam produced by the laser module, and a further rotatable sleeve connected to said mirror; said plurality of nitinol wires comprising a first nitinol wire connected to said first rotatable sleeve so as to control rotation thereof and thus control rotation of said laser beam, and a second nitinol wire connected to said further rotatable sleeve so as to control rotation thereof and thus control rotation of said mirror.

Further features and advantages of the present invention will be set forth in, or apparent from, the detailed description of preferred embodiments thereof which follows.

DETAILED DESCRIPTION OF THE PREFERRED EMBODIMENT

Figure 1:
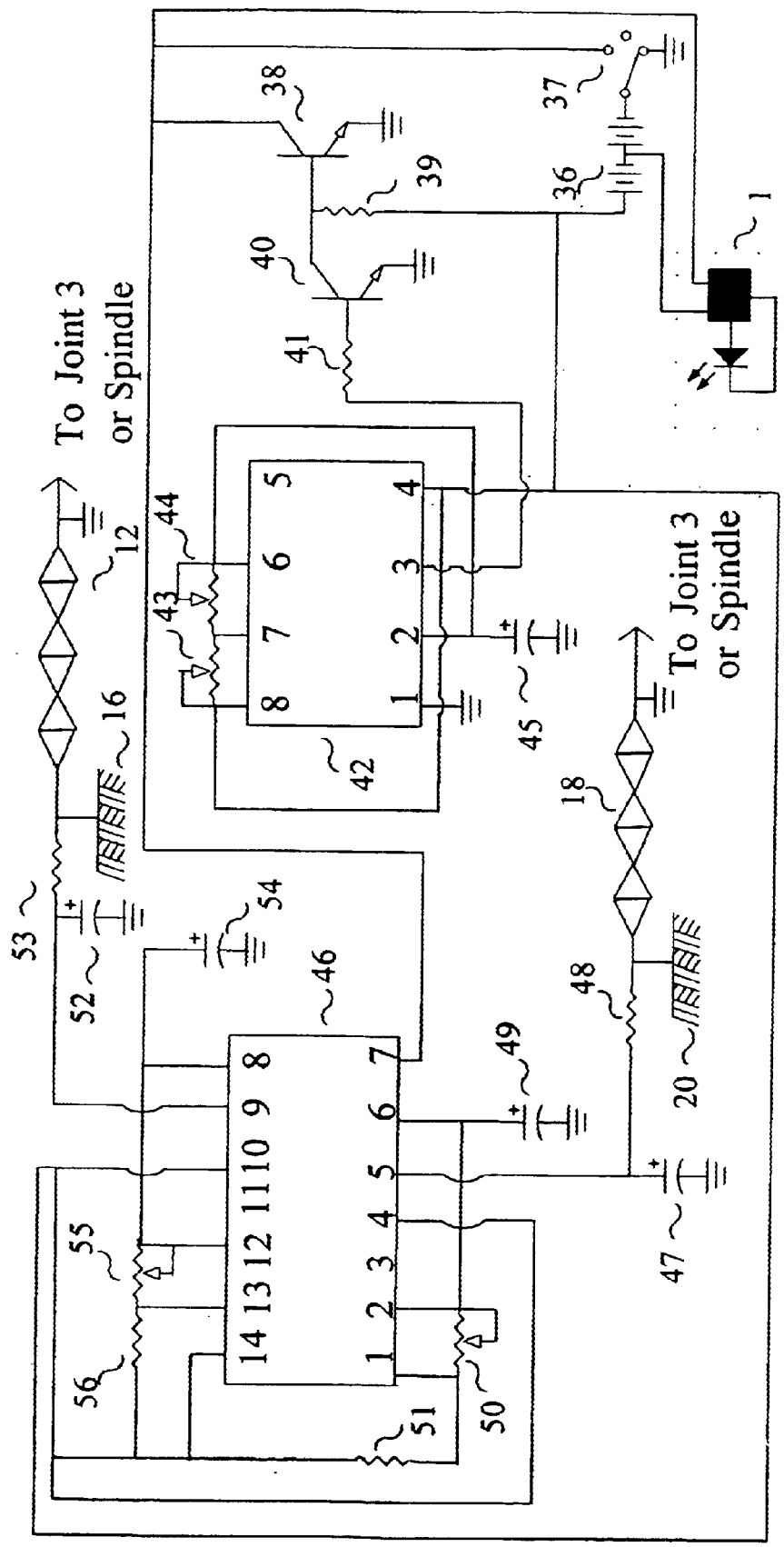
FIG. 1 is a schematic circuit diagram of the preferred embodiment of the circuitry of the electronic drive and timing components for the pet toy and exerciser of the invention.

Referring first to FIG. 1 and considering a first mode of operation, in a preferred embodiment of the invention, control circuitry as depicted in FIG. 1 is enabled by DPDT switch 37 in the up position, which provides energizing current to a laser diode module which is described below and is indicated at 1 in FIG. 1, and through a 556 integrated circuit 46, current for a pair of nitinol contracting wires 12 and 18. Integrated circuit 46 comprises two independent adjustable timer/oscillator circuits which periodically provide shaped current pulses to the nitinol wires 12 and 18. These currents periodically heat and,thereby induce a contraction/shortening of, the wires 12 and 18. As indicated above, the current pulses are supplied by the dual timer/oscillator circuits of the integrated circuit 46 and, in this regard, a nearly square wave output signal is supplied at pin 5 of circuit 46, at a frequency determined by an RC circuit comprising capacitor 49, and a pair of resistors 50 and 51, and is also supplied at pin 12 of circuit 46 at a frequency determined by an RC circuit comprising a capacitor 54, and a pair of resistors 55 and 56. In typical operation, the frequency of operation is approximately 0.1 Hertz.

As illustrated, resistors 50 and 55 are potentiometers, and are user adjustable to vary the movement rate of the laser module 1 in both the vertical and horizontal directions. Capacitors 47 and 52 are connected across the nitinol load and this results in the production of a nearly triangular waveform across the corresponding nitinol wires 12 and 18 to provide a smoother shortening and subsequent relaxation of the wires. In this mode, i.e., with switch 37 in the up position, the moving laser (or laser and mirror system) will remain in operation continuously, by bypassing an electronic switch 42 which is described below, and directly powering the laser system 1 and the control oscillators of integrated circuit 46.

In a further mode of operation, when the DPDT switch 37 is in the down position, the above-mentioned integrated circuit 42, which is an LM555 timer/oscillator, together with an inverter 40, formed by a 2N3904 transistor, and a power output transistor 38, function as a short duty cycle switch to periodically supply power to the timer oscillator circuits of integrated circuit 46 and the laser diode module 1. Further circuit elements include a resistor connected to the base of inverter 40, and a resistor 39 connected to a junction between inverter 40 and output transistor 38 and a battery 36. As shown, the latter is connected to laser diode module 1 and to the base terminal of switch 37. Further connections 16 and 20, described in more detail below, are provided at one end of the respective nitinol wires 12 and 18.

The combined values/settings of potentiometers 43 and 44, connected to timer/oscillator 42, determine the off time of the, timer/switch formed by the circuitry described above. The setting/value of potentiometer 43 determines the on time of the timer/switch. These parameters are also user selectable. This basic arrangement permits the selection of an adjustable time period where the moving laser system will automatically be activated for a set period of time and then subsequently be turned off for a set period of time. This cycling will be repeated as long as switch 37 is set to the down position in the automatic mode.

Figure 2:
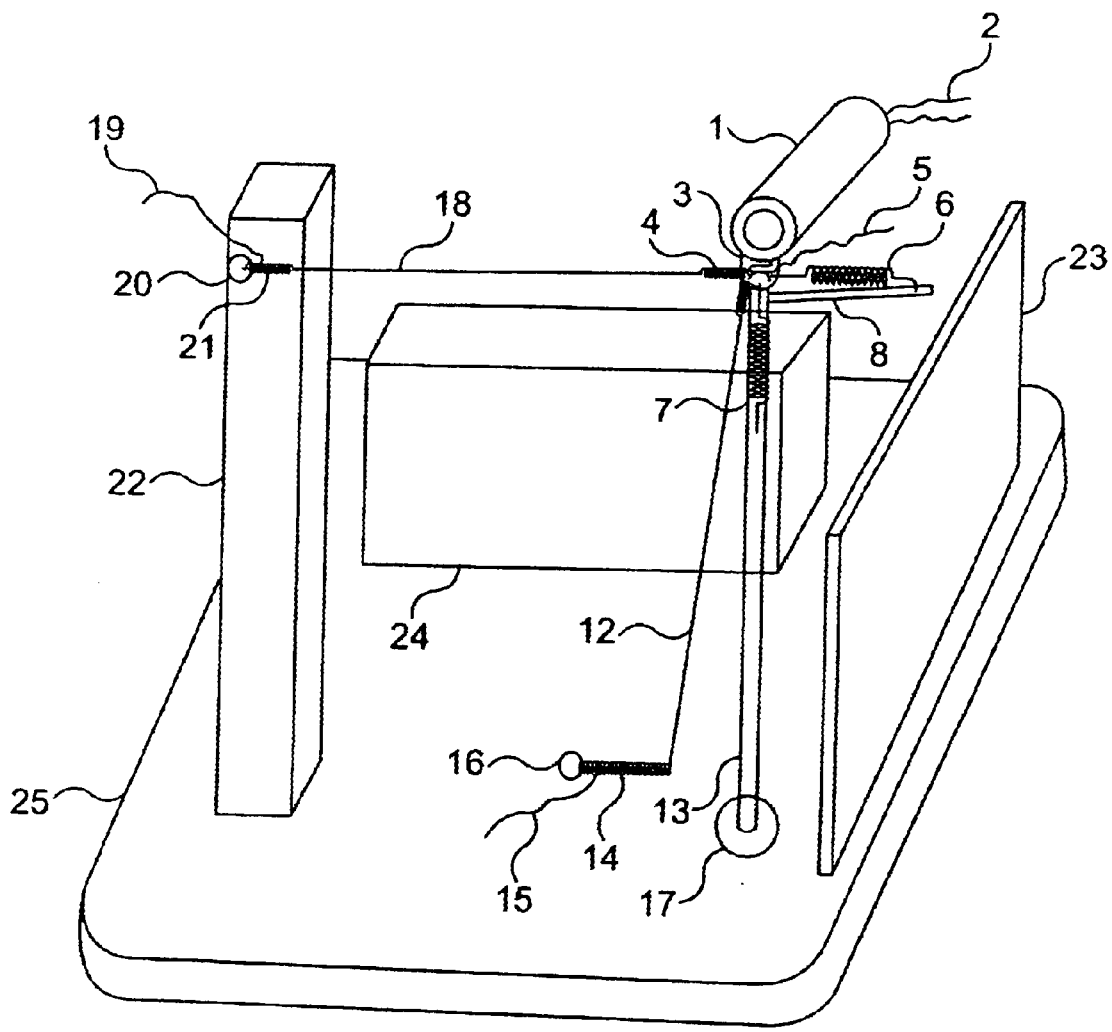
FIG. 2 is a front perspective view of a preferred embodiment of the automatic laser pet toy and exerciser of the invention.

Referring to FIG. 2, a first embodiment of the mechanical portion of the invention is shown. By virtue of the aforementioned connections 16 and 20 to the respective nitinol wires 12 and 18, at one end thereof, to base platform 25 and a support post or extension 22, and connections of nitinol wires 12 and 18 at the other end thereof to a universal joint 3, contraction of the wires 12 and 18 produce a simultaneous vertical and horizontal sweep of the laser beam projected by laser diode module 1.

More specifically, when nitinol wire 12 is heated and contracts, the laser module 1 is deflected up. Further, during cooling and relaxation of wire 12, module 1 is deflected downward through the pull of a return spring 7 that is fixed to a spindle 13. Similarly, when nitinol wire 18 is heated and contracts, the laser diode module 1 is rotated clockwise. During cooling and relaxation of wire 18, the laser module 1 rotates counterclockwise through the pull of a return spring 6. Spring 6 is fixed to a spring mount 8, which is similarly mounted upon spindle 13.

Figure 5:
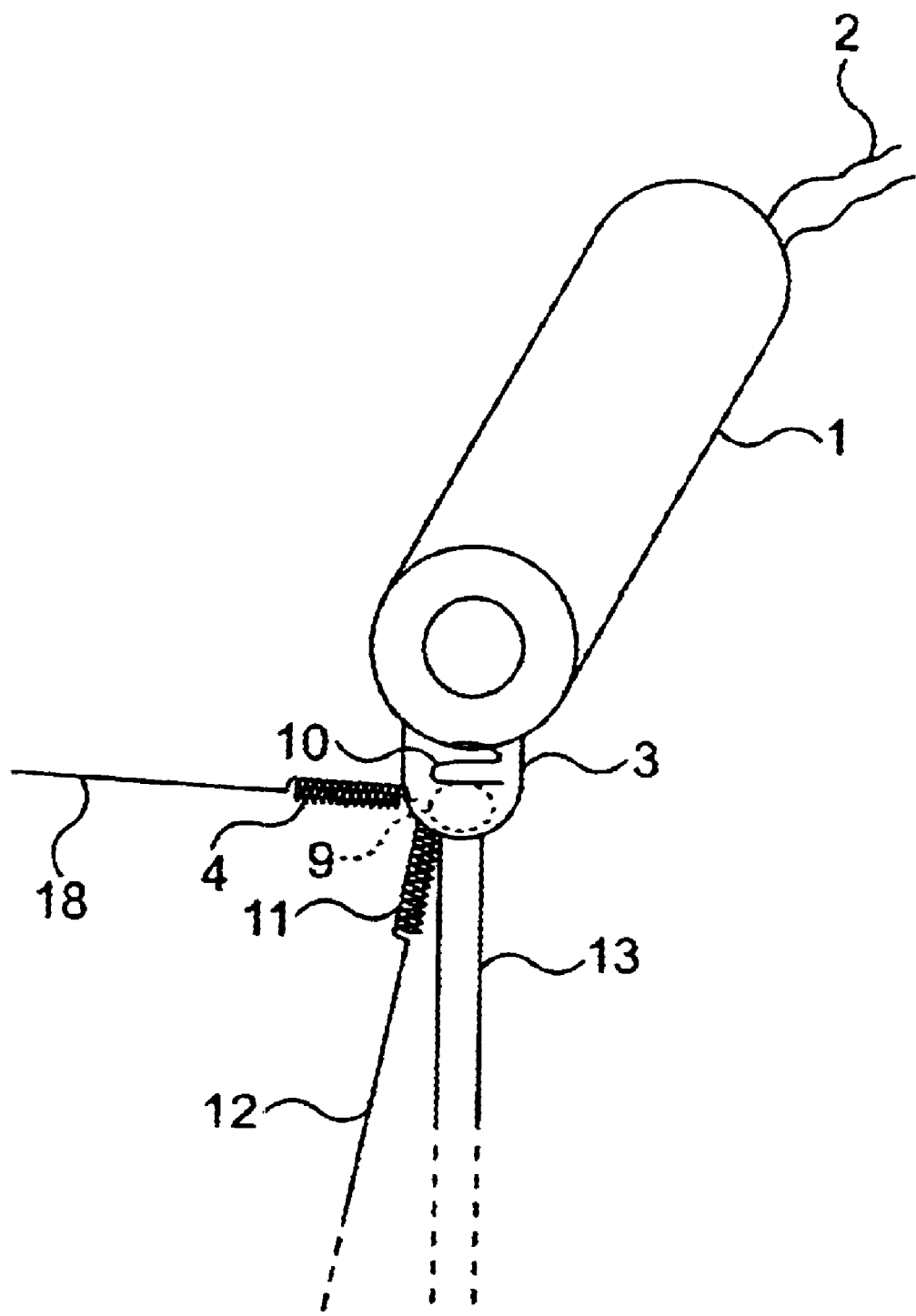
FIG. 5 illustrates a portion of FIG. 2, drawn to a larger scale, showing the laser module and universal joint in greater detail.

Universal joint 3 is shown in more detail in FIG. 5 and, as illustrated, includes a universal ball joint tension spring 10 which engages universal joint ball 9 within a universal joint housing 3. Laser power input wires are indicated at 2 in both FIGS. 2 and 5.

Referring again to FIG. 1, various nitinol wire crimp connectors are indicated at 4, 21, 14 and 11. A spindle base mount 17 is used to mount spindle 13. A battery holder 24 for battery 36 of FIG. 1 and a circuit board 23, which contains the electronic circuit illustrated in FIG. 1, are mounted on the device housing base or platform 25. The wire (conductive) connections to the nitinol wires 12 and 18 are indicated at 15 and 19, respectively.

Figure 3:
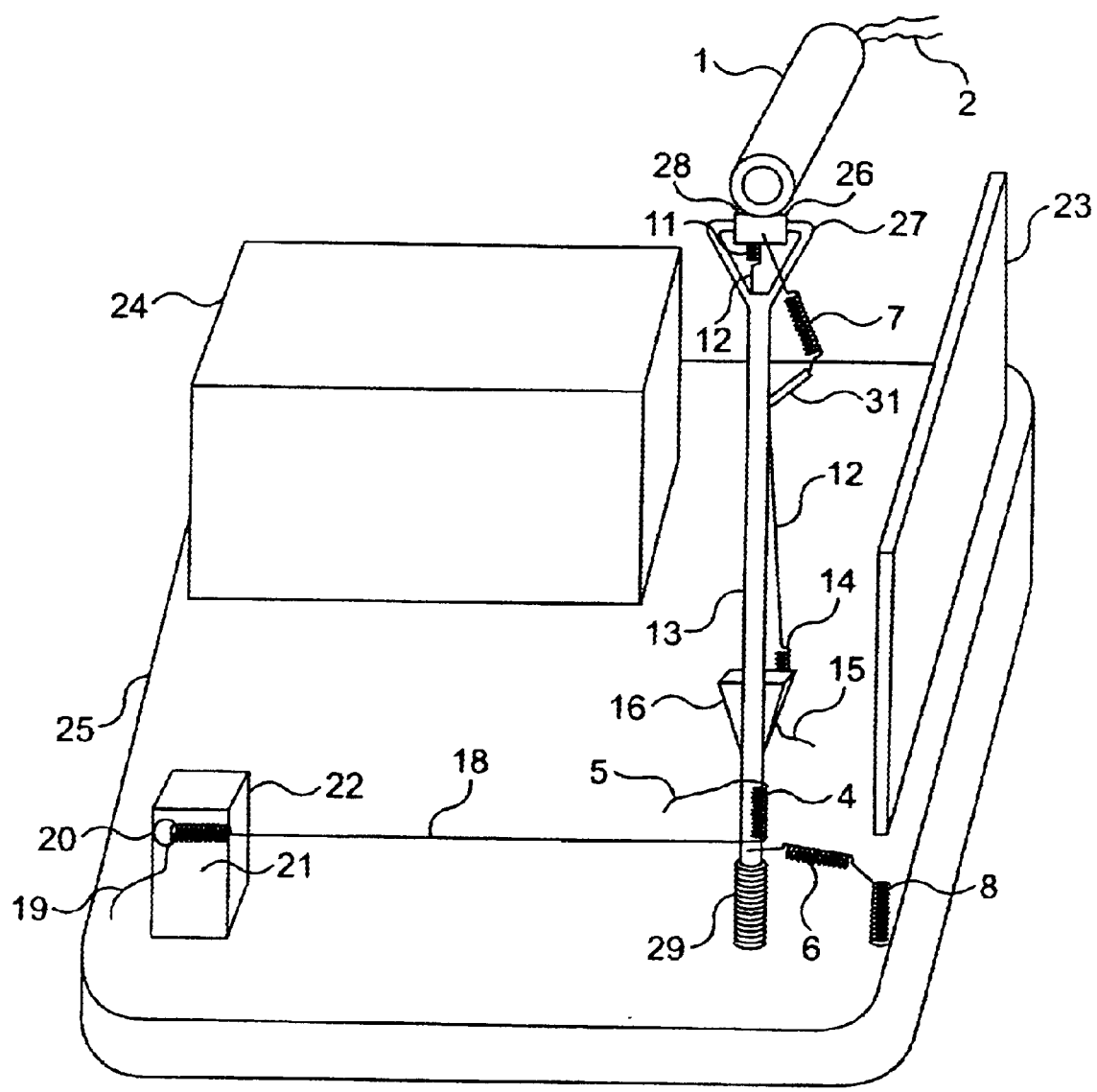
FIG. 3 is a front perspective view of an alternative embodiment of the automatic laser pet toy and exerciser of the invention.

FIG. 3 illustrates an alternative embodiment of the moving laser system of FIG. 2. This embodiment is similar to that of FIG. 2 and corresponding elements have been given the same reference numerals. In the embodiment of FIG. 2, heating of the nitinol wires 12 and 18 causes simultaneous rotation of a sleeve 26 supported by a support element 27 which is provided at the top of spindle 13. Contraction of wire 12 deflects the laser module 1, and the beam produced thereby upwardly, while during cooling and relaxation, return spring 7 rotates the laser module so as to point downwardly to the starting position. Similarly, when wire 18 contracts, the spindle 13, which is loosely positioned in a sleeve 29, rotates clockwise. During cooling and relaxation of wire 18, return spring 6 causes spindle 13 to rotate counterclockwise back to the starting position. This produces simultaneous up/down and left/right random motion of the laser module 1 and its associated beam.

Figure 4:
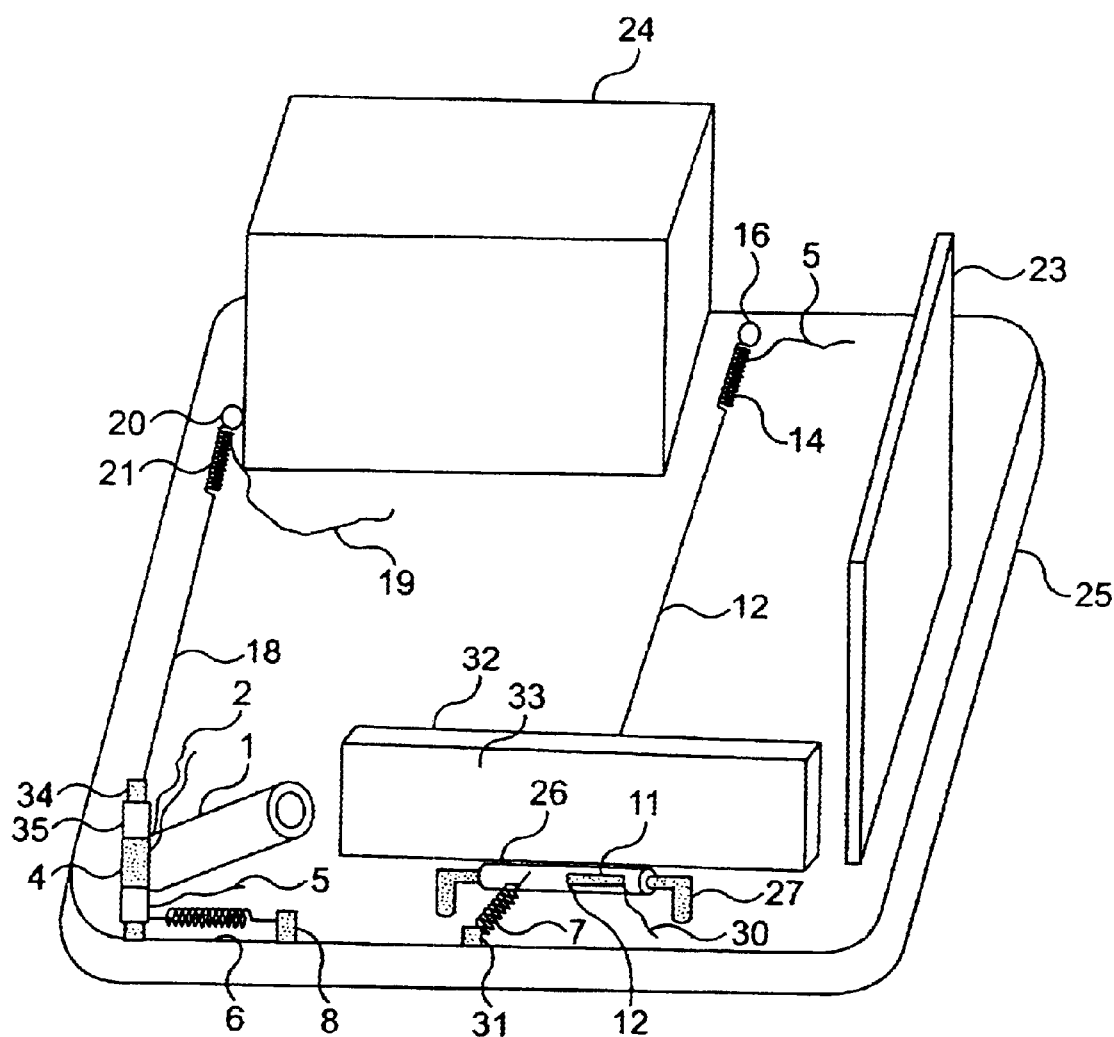
FIG. 4 is a front perspective view of another alternative embodiment of the automatic laser pet toy and exercise of the invention.

FIG. 4 illustrates another alternative embodiment of the invention. This embodiment is also similar to that of FIG. 2 and corresponding elements have again been given the same reference numerals. An advantage of the embodiment of FIG. 4 is that a low physical profile is provided, further miniaturizing the device. In this embodiment, the laser assembly 1 is fixed to a sleeve 35 and is rotated about a spindle 34 as nitinol wire 18 contracts and relaxes. During relaxation, spring 6 returns the laser module 1 to the resting/starting position. Simultaneously, when nitinol wire 12 contracts, a sleeve 26, fixed to a mirror 32 having a reflecting surface 33, rotates about a support spindle and associated mounting extensions 27. This movement of mirror 32 provides a vertical deflection of the projected laser beam from rotating laser module 1 which simultaneously produces a horizontal beam oscillation. During relaxation of the nitinol wire 12, the return spring 7 returns the sleeve 26 and mirror 32 to the starting position.

The component values and names/descriptions for the elements/components of FIGS. 1–5 are as follows:

1. Laser diode and drive assembly
2. Laser assembly power input wires
3. Universal joint housing
4. Nitinol wire crimp connector
5. Wire power (ground) connection to Nitinol wire
6. Horizontal deflection return spring
7. Vertical deflection return spring
8. Horizontal deflection return spring mount
9. Universal joint ball
10. Universal joint ball tension spring
11. Nitinol wire crimp connector
12. Nitinol wire (e.g., 100LT)
13. Spindle
14. Nitinol wire crimp-connector
15. Wire power connection to Nitinol wire
16. Crimp connector mounting
17. Spindle base mounting
18. Nitinol wire (e.g., 100LT)
19. Wire power connection to Nitinol wire
20. Crimp connector mounting
21. Nitinol wire crimp connector
22. Crimp connector support extension
23. Electronic component circuit board and components (FIG. 1)
24. Battery holder
25. Base of device housing
26. Rotatable sleeve
27. Axle and support for sleeve 26
28. Wire power connection (ground) to Nitinol wire
29. Spindle housing
30. Wire power connection to Nitinol wire
31. Return spring mounting
32. Mirror
33. Mirror reflecting surface
34. Spindle (horizontal deflection)
35. Rotatable sleeve
36. Battery
37. DPDT switch
38. NPN power transistor (e.g., TIP30, TIP125)
39. 1K Ohms ¼ Watt resistor
40. NPN transistor (e.g. 2N3904)
41. K Ohms ¼ watt resistor
42. LM555 integrated circuit
43. 2 Meg-Ohms potentiometer
44. 300K Ohms potentiometer
45. 1000 microfarads electrolytic capacitor
46. LM556 integrated circuit
47. 0.22 farad electrolytic capacitor
48. 5 Ohms ¼ watt resistor
49. 330 microfarads electrolytic capacitor
50. 50K Ohms potentiometer
51. 1K Ohms ¼ watt resistor
55. 0.22 farad electrolytic capacitor
53. 5 Ohms ¼ watt resistor
54. 330 microfarads electrolytic capacitor
55. 50K Ohms potentiometer
56. 1K Ohms ¼ watt resistor.

Although the invention has been described above in relation to preferred embodiments thereof, it will be understood by those skilled in the art that variations and modifications can be effected in these preferred embodiments without departing from the scope and spirit of the invention. For example, although reference has been made throughout to nitinol wires, other contracting wires could also be used.

What is claimed:

1. A pet toy and exerciser device comprising:

a housing;

a laser module for producing a laser beam;

mounting means for mounting said laser module within said housing so as to enable movement of the laser module in three dimensions;

at least one nitinol wire connected to the mounting means for the laser module, said at least one nitinol wire having a contraction state and a relaxation state and producing movement of said laser module in the contraction state of said at least one nitinol wire;

position restoring means connected to the mounting means for the laser module for returning said laser module to an initial rest position in the relaxation state of said at least one nitinol wire; and a user activated electrical control circuit connected to said at least one nitinol wire for controlling the states thereof.

2. A device in accordance with claim 1 wherein said control circuit includes a user adjustable electronic timer for automatically switching the states of the at least one nitinol wire on a periodic basis.

3. A device in accordance with claim 2 wherein said electronic timer includes means for providing automatic cyclic operation of the device between first and second modes wherein, during the first mode, the device operates automatically for a set period of time and, during the second mode, the device is turned off for a set period of time.

4. A device in accordance with claim 1 wherein said mounting means includes a universal joint for enabling movement of the laser module in three dimensions and said at least one nitinol wire comprises first and second nitinol wires connected to said universal joint so as to provide simultaneous vertical and horizontal sweeping of the laser beam produced by said laser module.

5. A device in accordance with claim 4 wherein said first nitinol wire controls up and down movement of said module and said second nitinol wire controls rotation of said module.

6. A device in accordance with claim 1 wherein said mounting means comprises a rotatable sleeve and a rotatable support spindle on which said sleeve is mounted, said module being mounted on said sleeve, and said at least one nitinol wire comprising a first wire connected to said sleeve to control rotation thereof, and a second wire connected to said spindle to control rotation thereof.

7. A device in accordance with claim 1 wherein said mounting means comprises a rotatable sleeve connected to said laser module, and said device further comprises a mirror for reflecting the laser beam produced by the laser module, and a further rotatable sleeve connected to said mirror; said at least one nitinol wire comprising a first nitinol wire connected to said first rotatable sleeve so as to control rotation thereof and thus control rotation of said laser beam, and a second nitinol wire connected to said further rotatable sleeve so as to control rotation thereof and thus control rotation of said mirror.

8. A pet toy and exerciser device comprising:

a housing;

a laser module, mounted within the housing, for producing a laser beam;

a plurality of nitinol wires coupled to the laser module so as to produce movement thereof, said nitinol wires having a contraction state and a relaxation state and producing said movement of said laser module in the contraction state of said nitinol wires;

a plurality of return springs connected to the laser module for returning said laser module to an initial rest position in the relaxation state of said nitinol wires; and a user activated electrical control circuit connected to said nitinol wires for, when activated, controlling the states thereof to produce movement of said laser beam.

9. A device in accordance with claim 8 wherein said control circuit includes a user adjustable electronic timer for automatically and periodically changing the states of the nitinol wires.

10. A device in accordance with claim 9 wherein said electronic timer includes means for providing automatic cyclic operation of the device between first and second modes wherein, during the first mode, the device operates automatically for a set period of time and, during the second mode, the device is turned off for a set period of time.

11. A device in accordance with claim 8 wherein said module includes a universal joint for enabling movement thereof in three dimensions and said plurality of nitinol wires comprise first and second nitinol wires connected to said universal joint so as to provide simultaneous vertical and horizontal sweeping of the laser beam produced by said laser module.

12. A device in accordance with claim 11 wherein said first nitinol wire controls up and down movement of said module and said second nitinol wire controls rotation of said module.

13. A device in accordance with claim 8 further comprising a rotatable sleeve and a rotatable support spindle on which said sleeve is mounted, said module being mounted on said sleeve, and said plurality of nitinol wires comprising a first wire connected to said sleeve to control rotation thereof, and a second wire connected to said spindle to control rotation thereof.

14. A device in accordance with claim 8 further comprising a rotatable sleeve connected to said laser module, a mirror for reflecting the laser beam produced by the laser module, and a further rotatable sleeve connected to said mirror; said plurality of nitinol wires comprising a first nitinol wire connected to said first rotatable sleeve so as to control rotation thereof and thus control rotation of said laser beam, and a second nitinol wire connected to said further rotatable sleeve so as to control rotation thereof and thus control rotation of said mirror.

* * * * *